United States Patent [19]

Kamata et al.

[11] Patent Number: 4,732,825

[45] Date of Patent: Mar. 22, 1988

[54] FLAT CELL

[75] Inventors: Nobuo Kamata; Iwao Kishi; Toyoo Harada; Kazutoshi Takeda; Hiroaki Aihara; Tatsuo Arakawa, all of Sendai, Japan

[73] Assignee: Seiko Electronic Components Ltd., Miyagi, Japan

[21] Appl. No.: 873,674

[22] Filed: Jun. 12, 1986

[30] Foreign Application Priority Data

Dec. 10, 1985 [JP] Japan ................... 60-277432

[51] Int. Cl.$^4$ ............................................. H01M 6/14
[52] U.S. Cl. ................................... 429/162; 429/174; 429/185; 429/194
[58] Field of Search ............... 429/162, 163, 185, 171, 429/174, 224, 194

[56] References Cited

U.S. PATENT DOCUMENTS

| 3,870,566 | 3/1975 | Bergum et al. | 429/162 X |
| 4,059,717 | 11/1977 | Bredland et al. | 429/162 |
| 4,070,528 | 1/1978 | Bergum et al. | 429/152 |
| 4,177,330 | 12/1979 | Gordon et al. | 429/162 X |

FOREIGN PATENT DOCUMENTS

| 0150054 | 7/1985 | European Pat. Off. |
| 190777 | 4/1986 | Japan |
| 190778 | 4/1986 | Japan |

OTHER PUBLICATIONS

Patent Abstracts of Japan, vol. 8, No. 194, (E-264), Sep. 6, 1984, The Patent Office Japanese Govt., p. 101 E 264, Kokai-No. 59-83 340-Matsushita.

Primary Examiner—Anthony Skapars
Attorney, Agent, or Firm—Bruce L. Adams; Van C. Wilks

[57] ABSTRACT

A flat cell is sealed along the confronting peripheral inner surfaces of positive and negative terminal plates. A pair of sealing films are disposed on the respective peripheral inner surfaces. Each sealing film is comprised of a first thermoplastic layer composed of maleic acid modified polyethylene thermally secured to the peripheral inner surface, a second intermediate thermoplastic layer composed of high-density polyethylene and a third thermoplastic layer composed of maleic acid modified polyethylene so that the confronting third layers of the pair of sealing films are thermally secured to each other to seal the flat cell.

29 Claims, 8 Drawing Figures

FLAT CELL

BACKGROUND OF THE INVENTION

The present invention relates to a flat cell.

The prior art related to the present invention includes a technique of a flat cell in which laminated electric-power-generating elements are held between a pair of sheet-like metal terminal plates having a predetermined shape, and an annular insulating member is interposed between the respective peripheral edges of these terminal plates so that the electric-power-generating element is hermetically sealed. In a cell which employs an active light metal such as lithium as a negative active material, lithium and water vapor react with each other to generate hydrogen gas, causing the internal pressure of the cell to rise. Therefore, the above-described annular insulating member must be designed so as not to become defective as a result of such rise in the cell internal pressure. In Japanese Unexamined Patent Publication No. 83340/1984, maleic anhydride modified polyethylene resin is employed as the annular insulating member and is bonded to the terminal plates by hot-plate pressure bonding, inpulse bonding, ultrasonic bonding, etc. In this prior art, a separator which is made from polypropylene nonwoven fabric is interposed between the positive active material and the negative active material, i.e., Li.

The use of only maleic anhydride modified polyethylene resin as a sealing member, however, has led to short-circuiting between a positive terminal plate and a negative terminal plate when the peripheral portion of the cell is heat-sealed under pressure.

Further, since it is difficult to make uniform the thickness of the heat-sealed peripheral portion of the cell, the prior art has the disadvantage of poor sealing properties of the cell. Because the sealing member is heat-sealed under pressure at a melting point or more, there may be variations in the thickness of the sealing member along the periphery of the cell.

SUMMARY OF THE INVENTION

It is an object of the present invention to provide a flat cell which has greatly improved sealing properties and hence excellent long-term reliability.

It is another object of the present invention to provide a flat plate type lithium cell in which short-circuiting is prevented from occurring inside the cell and the sealing area along the outer periphery of the cell.

It is still another object of the present invention to provide a stable flat plate type lithium cell which bulges less even when stored or used over a long period of time.

An advantage of our invention is that it provides a cell applicable to IC card which requires the thickness under 0.5 mm, the large capacity and the battery life over five years, thin-type desk-top calculators, watches, greeting cards, etc.

The above and other objects and features of the invention will appear more fully hereinafter from a consideration of the following description taken in connection with the accompanying drawings wherein one embodiment is illustrated by way of example.

DETAILED DESCRIPTION OF THE INVENTION

Figure 1:
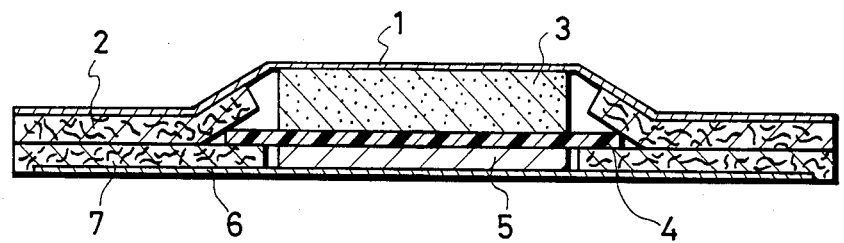
FIG. 1 is a sectional view of a flat cell.

FIG. 1 is a sectional view of the flat cell according to the present invention.

The size of this cell is 23×28×0.5 mm (CS 2328, open-circuit voltage $V_{oc}$ 3 V, nominal capacity 30 mAh).

The reference numeral 1 denotes a positive terminal plate or substrate which also serves as a current collector. The positive terminal plate 1 is made of a nickel foil, or the like and has a thickness of 30 μm.

The reference numeral 6 denotes a negative terminal plate or substrate which also serves as a current collector.

The numeral 3 denotes a positive mixture sheet or electrode which is disposed in contact with the central inner surface of the positive terminal plate 1. This sheet 3 is formed by filling the mixture of $MnO_2$, an electrically conductive material and a binder into a core material made from a stainless steel net and by applying a pressure to this mixture so that it is reduced in thickness and has a high density.

The numeral 4 denotes a separator which is interposed between the positive mixture sheet 3 and a lithium negative active material or negative electrode 5 such as lithium which is disposed on the central inner surface of the negative terminal plate 6.

As illustrated, preferably the peripheral portion of the separator 4 is clamped by a positive sealing member 2 and a negative sealing member 7, whereby short-circuiting is prevented from occurring through the separator 4 and at the outer peripheral portion thereof. Thus, the area between the respective peripheral inner surfaces of the positive terminal plate 1 and the negative terminal plate 6 is hermetically sealed by the combination of the positive sealing member 2 and the negative sealing member 7.

Figure 2:
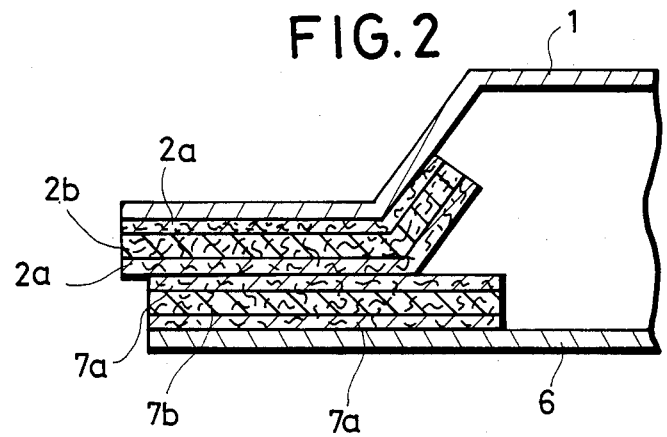
FIG. 2 is an enlarged sectional view of a sealing portion of the cell.

FIG. 2 is an enlarged view of a sealing portion of the cell according to the present invention. Each of the sealing members 2, 7 comprises a two-material three-layer film of maleic acid modified polyethylene resin/layer intermediate high-density polyethylene resin layer/maleic acid modified polyethylene resin layer which is produced by inflation method. The reference numerals 2a, 7a in FIG. 2 denote maleic acid modified polyethylene, and the numerals 2b, 7b denote high-density polyethylene.

Preferably the maleic acid modified polyethylene resin employed is prepared by graft-polymerizing maleic acid to an intermediate-density polyethylene. The optimum graft ratio of maleic acid is 0.05 to 0.2%. A graft ratio of maleic acid in excess of 0.2% increases the permeability of moisture, and such material is therefore unsuitable as a sealing material for the lithium cell. On the other hand, a graft ratio of maleic acid not greater than 0.05% degrades the adhesion to the positive and negative terminal plates 1, 6, so that such material cannot function as a sealing material. This maleic acid modified polyethylene film has a thickness of 30±5 μm, a melting point or temperature (DSC method) of 120° C., a melt index (JIS K6760) of 0.3 (g/10 min) and a density (JIS K6760) of 0.91 (g/cm³). When this thermoplastic layer or film has an excessively small thickness, the resin may flow and leak out of the sealing portion of the cell during the heat sealing, resulting in an increase in the rate of occurrence of sealing failure. It has experimentally been found that the film needs to have at least a thickness of 20 μm. When the thickness of this film is excessively large, the resin can sufficiently perform sealing even when a portion of the resin flows out due to the heat and pressure during the heat sealing. However, an excessively large film thickness is not preferable from the viewpoint of prevention of intrusion of moisture from the outside of the cell. This is because a polyethylene graft-polymerized with maleic acid has a larger permeability of moisture than that of a polyethylene which is not graft-polymerized with maleic acid although the former has improved adhesion or adhesive capacity to a metal.

In short, it is important that the film has a necessary minimum thickness effective to make uniform the thickness of the heat sealed portion and ensure the required sealing properties.

An explanation will be made below about the high-density polyethylene film employed in the present invention. Since this high-density polyethylene film is not graft-polymerized with acrylic acid, it has no adhesion or adhesive capacity to a metal and just serves as a spacer for maintaining the distance between the positive and negative terminal plates, that is, the thickness of the sealing portion of the cell.

The thickness of this film may be set as desired in accordance with the thickness of the cell. Since the thickness of the cell in accordance with this embodiment of the present invention is 0.5 mm, the thickness of this film is suitably set so as to fall between 50 and 200 μm.

This thermoplastic film has a melting point or temperature (DSC method) of 129° C., a melt index (JIS K6760) of 0.6 (g/10 min) and a density (JIS K6760) of 0.95 (g/cm³).

The melt index represents the fluidity of resins. The large the number of the index, the lower the fluidity. More specifically, since this high-density polyethylene is the same type of polyethylene as the maleic acid modified polyethylene and is therefore thermoplastic or heat-fusible, there is no fear of moisture entering through the bonded area. In addition, the melting point of this polyethylene is 9° C. higher than that of maleic acid modified polyethylene and is less fluid. It is therefore possible for this film to serve as an excellent spacer. Further, since this film is not graft-polymerized with maleic acid, it is less permeable to moisture and therefore capable of serving as an excellent sealing material.

Comparison was made as to ratio of short-circuiting failure between the sealing member composed of a two-material three-layer film according to the present invention and the conventional sealing member, composed of a one-layer film. The results are shown in Table 1 below. (Data n=100)

TABLE 1

|  | Ratio of short-circuiting failure (%) |
|---|---|
| Cell of the invention | 0% |
| Conventional cell | 37% |

As will be clearly seen from Table 1, the cell according to the present invention can prevent a short-circuiting failure and is an excellent.

The reason why the cell according to the present invention has such excellent properties is that the sealing member has a two-material three-layer structure in which maleic acid modified polyethylene resin layers are disposed on the opposite sides of a high-density polyethylene resin layer. Namely, since a melting point of high-density polyethylene resin is about 10° C. higher than that of maleic acid modified polyethylene resin, in case that the maleic acid modified polyethylene resin is heated to its melting point, begins to melt and becomes soft, the high-density polyethylene resin does not become soft and it functions as an electrical insulating material.

Further, comparison was made as to moisture permeability between the sealing member according to present invention and the conventional sealing member.

The test was carried out as follows: A cell was made as shown in FIG. 1 and was heat-sealed to contain therein only 200 μl electrolyte in place of electric-power generating elements. This cell which contains only electrolyte were stored in a thermo-hygrostat under 80° C. and relative humidity (R.H.) of 90 to 95% for 10 days, the moisture content which is collected from 100 μl electrolyte of the cell by microsyringe were examined by moisturmeter. The results are shown in Table 2 below. (Data n=24)

TABLE 2

|  | $\bar{x}$ | R |
|---|---|---|
| Sealing member of the invention | 200 ppm | 100 ppm |
| Conventional sealing member | 1000 ppm | 500 ppm |

In Table 2, $\bar{x}$ is average value of data n=24, and range R represents the difference between the maximum and minimum values of data wherein an electrolyte is propylene carbonate containing 1 mol LiClO$_4$ and this electrolyte contains 15 ppm of moisture contents.

As will be clearly seen from Table 2, the sealing member according to the present invention can be more reliable. Because the amount of maleic acid modified polyethylene which has a moisture permeability larger than that of high-density polyethylene is reduced as small as possible according to the present invention.

Next, comparison was made as to ratio of short-circuiting failure between the sealing member comprised of positive and negative sealing members thermo-welded to inner peripheral portions of the positive and negative terminal plates, respectively, in advance and the sealing member not thermo-welded.

The results are shown in Table 3 below. (Data n=100).

TABLE 3

|  | Ratio of short-circuiting failure (%) |
|---|---|
| Cell of the | 0% |

| TABLE 3-continued | |
|---|---|
| | Ratio of short-circuiting failure (%) |
| invention | |
| Conventional cell | 100% |

As will be clear from Table 3, the cell according to the present invention can significantly prevent a short-circuiting failure in comparison with the conventional cell.

Employment of the sealing material of the type described above offers the following advantages.

1. Since the two opposite surfaces of the film are completely the same as each other, it is not necessary to discriminate between the bonding layer surface (the maleic modified polyethylene side) and the non-bonding layer surface (the high-density polyethylene side).
2. If the sealing material is thermo-welded to each of the positive and negative thermal plates in advance, when heat sealing is carried out after the electric power generating elements have been inserted in the cell, sealing can be effected more easily and more reliably since the films of maleic acid modified polyethylene, which has a lower melting point and better adhesion than those of a high-density polyethylene, are bonded to each other.
3. It is possible to effect heat sealing at a relatively low temperature and within a relatively short period of time, so that it is possible to reduce the thermal damage to and thermal deterioration of the lithium, organic electrolyte, separator and positive active material contained in the lithium cell.

Preferably the two-material three-layer film serving as the sealing member in the present invention is produced by inflation.

The following is preferably an explanation of the reasons why the two-material three-layer laminated film serving as the sealing member is produced by inflation.

General film manufacturing methods include (1) the T-die method and (2) the inflation method. The T-die method enables film to be manufactured at relatively low costs and is therefore widely used. The T-die method has, however, the following disadvantage. Since this method involves uniaxial stretching, the thermal shrinkage coefficient and the thermal expansion coefficient in the longitudinal direction and those in the lateral direction differ from each other when heat is applied to the film, which means that, when the film produced by the T-die method is employed as a sealing member, the sealing width differs for two directions. It is a matter of course that the sealing properties are degraded in a direction in which the sealing width is narrowed.

On the other hand, the inflation method includes biaxial stretching and therefore allows the inflated film to be isotropic in terms of the thermal shrinkage coefficient and the thermal expansion coefficient when it is heated and then cooled, although this is a costly film manufacturing method.

Accordingly, the film produced by the inflation method allows the sealing width at any position to be the same as that at other positions. Thus, it is possible to control the width of the sealing member and the sealing width so that they are uniform.

Preferably the sealing member is thermo-welded to each of the positive and negative terminal plates in advance.

The reasons why the sealing member is thermo-welded to each of the positive and negative terminal plates in advance will be explained below.

By so doing, there is no fear that the lithium, having a melting point of 170° C., is fused, and that the organic electrolyte is thermally decomposed.

More specifically, since an amount of heat and a magnitude of pressure which are adequate for the thermo-welding can be applied for the adequate period of time, the adhesion between the positive and negative terminal plates, and their corresponding sealing members become complete.

In a preferred arrangement, the positive terminal plate 1 is subjected to drawing in advance and has square or circular notches in the respective four corners along the outer periphery thereof, namely, the plate having pressed portion is manufactured in shape of square.

Figure 3B:
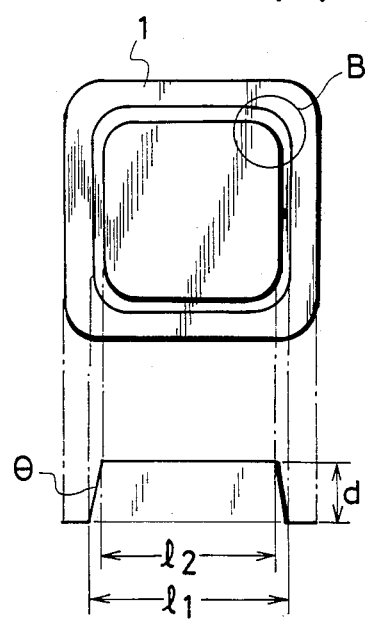
FIG. 3(A) and FIG. 3(B) are plan and sectional views, respectively, showing examples of a drawn metal terminal plate.
Figure 3A:
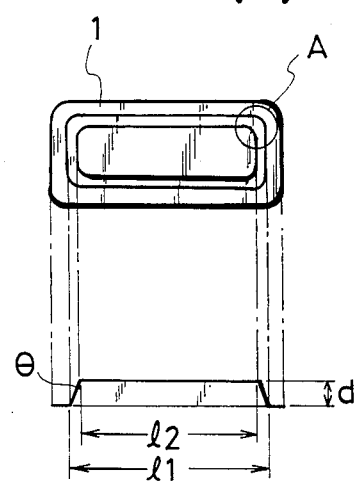

FIG. 3(A) shows front and plan views of one example of a metal terminal plate which has been subjected to drawing.

In FIG. 3(A), the reference symbol A denotes a round portion of the drawn part of the metal terminal plate having been subjected to drawing; d the draw depth; $l_1$, the outside dimensions of the drawn part; $l_2$, the inside dimensions of the drawn part; and $\theta$, the angle of inclination of the drawn part which is represented by $\tan \theta = (l_1 - l_2)/d$.

The external dimensions of this drawn metal terminal plate are 23×28 mm; the draw depth, 0.16 mm; $l_1$, 18×23 min; $l_2$, 16×21 mm; and $\theta = 80.9°0$ C. The radius of the round portion is 3 mm.

Comparison was made as to the long term reliability between the cell according to the present invention (shown in FIG. 1) employing the positive terminal plate 1 shown in FIG. 3(A) and a conventional cell employing a positive terminal plate not having been subjected to drawing.

The test was carried out in such a manner that the cells were stored in a thermo-hygrostat under 60° C. and RH of 90 to 95%, and changes in the open-circuit voltage (Voc), the internal resistance (Ri) and the thickness (H) were examined. The results are shown in Table 4 below. (Data n=24)

TABLE 4

| | | Storage time (days) characteristics | | | | | | | | | | |
|---|---|---|---|---|---|---|---|---|---|---|---|---|
| | | 0 | | 20 | | 40 | | 60 | | 80 | | 100 | |
| | | $\bar{x}$ | R | $\bar{x}$ | R | $\bar{x}$ | R | $\bar{x}$ | R | $\bar{x}$ | R | $\bar{x}$ | R |
| Cell of the invention | Voc (V) | 3.08 | 0.01 | 3.23 | 0.02 | 3.25 | 0.02 | 3.27 | 0.02 | 3.27 | 0.03 | 3.28 | 0.04 |
| | Ri (Ω) | 24 | 6 | 29 | 8 | 59 | 24 | 80 | 28 | 191 | 90 | 241 | 110 |
| | H (mm) | 0.47 | 0.01 | 0.47 | 0.01 | 0.48 | 0.01 | 0.49 | 0.01 | 0.52 | 0.08 | 0.57 | 0.11 |
| Conventional cell | Voc (V) | 3.08 | 0.02 | 3.23 | 0.03 | 3.28 | 0.04 | 3.28 | 0.05 | 3.30 | 0.07 | 3.32 | 0.09 |
| | Ri (Ω) | 25 | 7 | 62 | 27 | 86 | 35 | 198 | 87 | 235 | 105 | 354 | 152 |
| | H (mm) | 0.47 | 0.03 | 0.48 | 0.04 | 0.50 | 0.04 | 0.53 | 0.07 | 0.56 | 0.10 | 0.61 | 0.15 |

In Table 4, $\bar{x}$ represents a mean value of the data n=24, and R represents the difference between the maximum and minimum values of data.

As will be clearly seen from Table 4, the cell according to the invention has stable Voc, small rise in Ri and small increase in H as compared with the conventional cell.

The reason why the cell according to the invention has such excellent storage properties is that either the positive or negative terminal plate of the cell of the present invention is subjected to drawing in advance, and there is therefore no fear of any immoderate force acting on the sealing portion along the periphery of the cell in contrast to the conventional cells employing sheet-like terminal plates, whereby it is possible to maintain excellent sealing properties.

FIG. 3(B) shows plan and front views of another example of a metal terminal plate which has been subjected to drawing. The size of the flat plate type lithium cell shown in FIG. 3(B) is 40×40×0.5 mm (CS 4040).

In FIG. 3(B), the reference symbol B denotes a round portion of the drawn part of the metal terminal plate having been subjected to drawing; d, the draw depth; $l_1$, the outside dimension of the drawn part; $l_2$; the inside dimension of the drawn part; and $\theta$, the angle of inclination of the drawn part which is represented by tan $\theta = (l_1 - l_2)/d$.

The external dimensions of this metal terminal plate are 40×40 mm; the draw depth, 0.16 mm; $l_1$, 32×32 mm; $l_2$, 30×30 mm; and $\theta = 80.9°$.

The radius of the round portion is 5 mm.

Since the laminated electric-power-generating elements are incorporated in a hermetically sealed space inside the cell defined by the drawn positive terminal plate and the negative terminal plate, the sealing portion along the periphery of the cell is not subjected to any immoderate force, and it is possible to effect sealing with excellent adhesion between the terminal plates and the sealing members.

It is only necessary to draw either the positive or negative terminal plate. Thus, there is no fear of the sealing properties being deteriorated, and the inner wall of the drawn part can serve as an insertion guide when the electric-power-generating elements are inserted.

In addition, the provision of a round portion of 3 mm or more at each corner of the outer periphery of the positive and negative terminal plates and the provision of the drawn part enables a metal foil of a small thickness, i.e., 30 to 50 μm, to be drawn without breakage, distortion, wrinkle and other similar defects.

In order to reduce the overall thickness of the cell to less than 0.5 mm and maximize the cell capacity, the plate thickness is selected so as to fall in a range between 30 and 50 μm which has no pinhole and which provides adequate strength for practical use.

In order to set the overall thickness of the cell at 0.5 mm, the simple stacking dimension of the cell components and the electric power generating element is set at 0.45 mm and the thickness of each of the positive and negative terminal plates is set at 30 μm and, further, the thickness of each of the annular sealing members is set at 100 μm, the draw depth of the positive or negative terminal plate is 0.16 mm.

The present inventor carried out a drawing experiment using a nickel foil of 30 μm thickness.

When the external dimensions were 40×40 mm and the dimensions of the drawn part were 32×32 mm, the draw depth was 0.16 mm.

Then, examination was made as to whether or not there was any breakage of the metal foil and as to whether or not the round portion or the peripheral portion of the metal terminal plate had any warp, wrinkle or distortion after the drawing, for different dimensions of the round portion.

As a result, when the size of the round portion was 3 mm or less, the metal foil was broken at the drawn part. When the round portion was 3 to 4 mm long, warp, wrinkle and distortion were produced at the periphery of the metal terminal plate. When the size of the round portion was 5 mm, favorable results were found, namely, the metal foil was not broken, and no warp, wrinkle or distortion was found at the peripheral portion of the metal terminal plate.

When the external dimensions of the metal terminal plate were 23×28 mm and the dimensions of the drawn part were 16×21 mm, the draw depth was 0.16 mm.

Then, examination was made as to whether or not there was any breakage in the metal foil and so to whether or not the round portion or the peripheral portion of the metal terminal plate had any warp, wrinkle or distortion after the drawing, for different dimensions of the round portion.

As a result, when the size of the round portion was 1 mm and 2 mm, the drawn part was broken, and warp, wrinkle and distortion were produced at the peripheral portion of the metal terminal plate. When the size of the round portion was 3 mm, the metal foil was not broken, and no warp, wrinkle or distortion was found at the peripheral portion of the metal terminal plate.

As described above in detail, it is possible to greatly improve the sealing properties and to enhance the long-term reliability for a large margin by employing a positive terminal plate and a negative terminal plate either of which has been subjected to drawing such that a round portion of 3 mm or more is formed at each of the corners of the drawn part.

In a preferred arrangement, the size of the positive terminal plate 1 of the cell may be set so that the terminal plate 1 is larger than the projecting portion of each of the positive and negative sealing members 2, 7.

By so doing, the external dimensions of this positive terminal plate 1 enable positioning to be effected, and the positive terminal plate 1 can be shaved so that predetermined external dimensions are obtained.

The reasons why the positive and negative terminal plate 1, 6 have different external or peripheral dimensions will be explained below.

One of the reasons is to prevent the positive and negative terminal plates 1 and 2 from short-circuiting with each other when heat sealing is carried out for sealing the cell. This short-circuiting occurs because the highest pressure is applied to the outermost peripheral portion of the cell when subjected to heat sealing and because the positive and negative terminal plates 1, 6 have burrs produced as a result of the pressing operation.

Another reason is that, when the positive and negative terminal plates 1, 6 are simultaneously blanked when the cell is subjected to the external shaving, burrs which are produced as a result of blanking may contact the positive and negative terminal plates 1, 6 to cause short-circuit.

In a preferred arrangement, a separator may be formed by rolling two overlaid strips of polypropylene nonwoven fabric of 20 g/m² in weight. The thickness of each strip of polypropylene nonwoven fabric before rolling is 60 μm, and two strips of such fabric are overlaid one upon the other and rolled so that the overall thickness is 80 μm. The rolled separator of the two-layer or double layer structure is of 40 g/m² in weight.

Morethen, nonwoven fabric before press is manufactured by micro-spunbond and treated with anion surface active agent. If this nonwoven fabric is not treated with the anion surface active agent, this nonwoven fabric has poor wetting property relative to electrolyte. In result, inpeadance of battery increases.

The reason why the arrangement employs such specially fabricated separator is to prevent short-circuiting between the lithium serving as a negative active substance and the positive active substance through the separator when the cell is strongly pressed from the upper and lower sides thereof.

Figure 4:
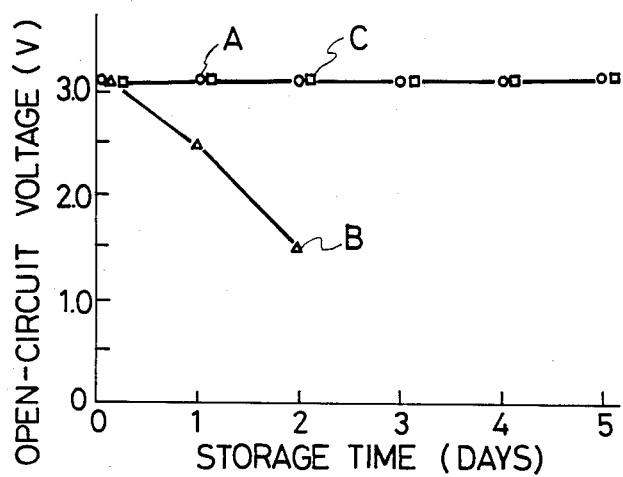
FIG. 4 is a grah showing the relationship between the storage time (days) and the open-circuit voltage of the cell.

FIG. 4 is a graph showing the results of measurement of the open-circuit voltage of cells employing various separators when cells were stored at 80° C. and RH of 90 to 95% under an external pressure of 10 kg/cm² applied to the upper and lower sides thereof. In the graph: A represents a battery having the separator in accordance with the present invention; C represents a battery having nonwoven fabric separator formed by polypropylene having 120 μm thickness and 37 g/m² density in terms of METSUKE; and B represents a battery having a single-layer polypropylene nonwoven fabric separator having a thickness of 50 μm and a fiber density of 20 g/m².

In FIG. 4, each dot represents a mean value of the data n=24.

As showing in FIG. 4, the open-circuit voltage of this present battery A and the conventional battery C keep in good result. But the open-circuit voltage of the conventional battery B drops down in bad result.

The good result of battery A and C is obtained by preventing the contact between lithium active material and positive active material through the separator, then, batteries A and C do not exhibit short-circuiting.

On the other hand, the separator of battery C is thick in 120 μm so that this battery has demerit greater of thickness.

The inventive battery A uses a thin separator of 80 μm thickness, however, this battery does not exhibit short-circuiting through the separator.

The reason why are obtained is good results as follows.

The separator of the inventive battery is manufactured by laminating by nonwoven fabrics with each other on roll-pressing such that the position of pore of the two nonwoven fabrics shifts each other, so that this structure prevents contacting between lithium active material and positive active material.

Since the thickness of the cell according to the present invention is 0.5 mm, it is necessary to minimize the thickness of the separator for the purpose of increasing the cell capacity. The thickness of a single-layer separator, i.e., 50 μm, undesirably causes short-circuit through the separator. On the other hand, a separator thickness of 120 μm prevents short-circuiting through the separator but undesirably increases the thickness of the cell as a whole and is therefore unsuitable for the cell according to the present invention.

The reason why the separator in accordance with the preferred arrangement is effective in prevention of short-circuiting is that, since two strips of nonwoven fabric having a relatively large value of are laid one upon the other and rolled to form the separator, no through-hole (pinhole) is present in the separator, and by-pass passages may be formed instead. In addition, since possible through-holes in the two layers of the separator are offset from each other by laying two strips of nonwoven fabric one upon the other, there is no through-hole which extends straight through the two strips.

For the purpose of further reducing the thickness of the separator, a microporous polypropylene film having a thickness of 25 μm and condenser paper having a thickness of 10 to 50 μm were experimentally used. These materials, however, caused the internal resistance of the cell to increase to several KΩ. Therefore, they cannot be used in the cell according to the present invention. The reason why the internal resistance is increased is that, since the cell according to the present invention can contain only a very small amount of electrolyte, the separator cannot become sufficiently wet.

In a preferred arrangement, the peripheral portion of the separator is clamped between the positive and negative sealing members as shown in FIG. 1.

Since the material for the separator is polypropylene and the material for the sealing members is polyethylene, the separator and the sealing members are thermowelded and thereby secured together during the heat sealing.

By securing the peripheral portion of the separator between the sealing members in this way, it is possible to prevent deterioration of lithium as a negative active substance by the migration of the positive active substance even when the positive active substance spills during the storage or use of the cell over a long period of time.

In addition, even when the positive active substance and the negative active substance undesirably become offset from each other, they are prevented from contacting each other.

In particular, when the cell of the present arrangement is bent, the present invention exhibits advantageous effect.

The following is a description of the method of manufacturing the flat plate type lithium cell according to the present invention.

A positive mixture sheet 3 containing manganese dioxide as a main body is inserted into and mounted on the inner side of the positive terminal plate 1 having external dimensions of 27×32 mm. The separator 4 is then mounted on the positive mixture sheet 3.

Preferably this positive mixture sheet 3 is treated with electrolyte before it is incorporated in the cell. This treatment is carried out as follows. One hundred positive mixture sheets 3 are prepared and dipped in a vessel containing 50 cc of an electrolyte of 1 mol LiClO₄/propylene carbonate (PC). After the treating vessel has been sealed hermetically, heat treatment is carried out at 120° C. for 15 Hr. After the heat treatment, the positive mixture sheets are taken out from the vessel and dipped in 50 cc of another new electrolyte at room temperature for more than 30 minutes, whereby the old electrolyte contained in the positive mixture sheets is replaced with the new electrolyte.

The positive sheets treated with the new electrolyte are taken out and use as a positive active substance for the cell.

The relationship between this electrolyte and the theoretical capcity of MnO₂ to be treated is represented by "the theoretical capacity of MnO₂ to be treated"/"- the amount of required electrolyte"=50 to 100 mAh/cc.

The following is an explanation of the reason why the positive active substance is reacted with the electrolyte in advance in the arrangement.

It has heretofore been known that ethylene carbonate and $MnO_2$ react with each other to generate $CO_2$.

The following reaction formula is known:

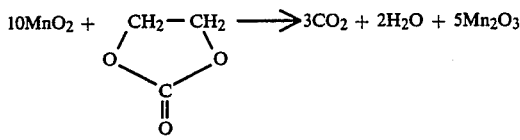

The above formula described in Blomgren, G. E. (1983), "Lithium Batteries" (J. P. Gabano, ed.), P22, Academic Press, New York and London, for example.

In the preferred arrangement, in the present case, the generation of gas by the reaction between $MnO_2$ and the electrolyte is prevented by appropriately setting conditions for reaction between the positive mixture sheet and the electrolyte constituted by propylene carbonate (PC) containing 1 mol $LiClO_4$.

Figure 5:
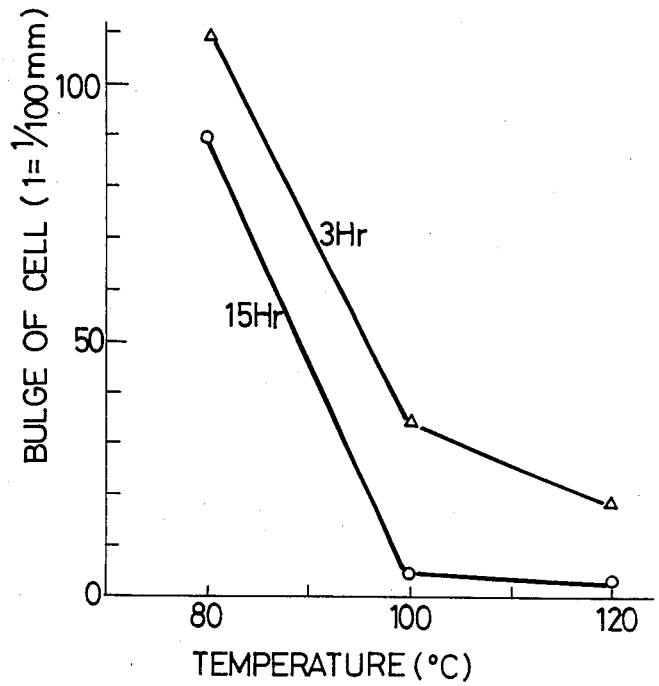
FIG. 5 is a graph showing the relationship between the temperature by which the positive material has been treated by electrolyte and the bulge of the cell.

FIG. 5 is a graph showing the relationship between the temperature and time for reaction between the positive mixture sheet and the electrolyte and the amount by which the cell bulges.

Each of the cells employed in the experiment was formed in such a manner that the positive mixture sheet was treated in electrolytes at 80° C., 100° C. and 120° C. and 15 Hr each and then sealed in the cell, together with the separator 4 and the electrolyte.

After this cell was stored for 5 days in a thermohygrostat under the conditions that the temperature was 80° C. and the relative humidity (RH) was 90%, the difference between the thicknesses of the cell measured before and after the storage was obtained, and the calculated difference was defined as the amount by which the cell bulged. One unit of the bulge of the cell equals 0.01 mm.

It will be understood from the graph shown in FIG. 5 that it is preferable to treat the positive mixture sheet with electrolyte at 100° C. or higher. As to the treating time, 15 Hr is preferable to 3 Hr.

In practice, conditions of 100° C. for 15 Hr and 120° C. for 15 Hr are suitable.

The reason why an advantageous effect is obtained by making the positive mixture sheet and the electrolyte react with each other in advance is presumed that the active portion in $MnO_2$ contained in the positive mixture sheet is deactivated through the reaction with the electrolyte.

With regard to the reaction conditions according to the arrangement, there is no risk of the electrical capacity of $MnO_2$ decreasing, and there is therefore no fear of the cell capacity decreasing.

A reaction at 140° C. or higher disadvantageously causes the cell capacity to decrease.

Preferably the separator 4 is integrally formed by rolling two strips of polypropylene nonwoven fabric of 20 g/m$^2$ in terms of weight per m$^2$ which are laid one upon the other and bonding them together in one unit. The outer periphery of this separator 4 is clamped and thereby secured between the sealing members 2 and 7. When the outer peripheral portion of the cell is subjected to heat sealing, the outer peripheral portion of the separator 4 is also thermo-welded to the sealing members 2 and 7, whereby it is even more reliably secured.

Lithium 5, which serves as a negative active material, is contact-bonded to the inner side or surface of the negative terminal plate 6. This negative terminal plate 6 is made of nickel, aluminum, stainless steel or the like and has external dimensions of 22×27 mm and a thickness of 30 μm.

Each of the sealing members 2, 7 is a three-layer film composed of two different kinds of material, i.e., maleic acid modified polyethylene of 30±5 μm thickness and a high-density polyethylene of 60±5 μm thickness. The sealing members 2, 7 are respectively thermo-welded to the inner surfaces of the outer peripheries of the positive and negative terminal plates 1 and 6 in the manner described below.

The positive terminal plate 1 and the positive sealing member 2 (the outside dimensions: 23×28 mm; the inside dimensions: 16.6×21.6 mm) are laid one upon the other so that they are not offset from each other, and contact-bonded by pressing a hot plate against the positive terminal plate 1. The temperature at this time is 160±10° C., while the pressure is 2±0.5 kg/cm$^2$, and the press time is 3 to 5 seconds.

The positive terminal plate 1 and the positive sealing member 2 thus bonded together in one unit are heated in a vacuum ($10^{-2}$ mmHg) at 200° C. for 10 minutes, whereby the positive terminal plate 1 and the positive sealing member 2 can be thermo-welded together even more rigidly and reliably.

Similarly, the negative terminal plate 6 and the negative sealing member 7 (the outside dimensions: 22×27 mm; the inside dimeneions: 16×21 mm) are thermo-welded together.

The components of the cell are assembled in the following manner. On the negative terminal plate 6 placed first, the lithium 5, the separator 4 and the positive mixture sheet 3 are successively mounted and laminated. Then, the positive terminal plate 1 is mounted so as to cover the laminated components, and heat sealing is effected along the peripheral edges of the positive and negative terminal plates 1, 6, whereby the cell is completely hermetically sealed.

Preferably the positive and negative terminal plates 1, 2 have different dimensions. This is possible to prevent short-circuiting at the peripheral edges of these plates during this heat sealing.

Further in a preferred arrangement, the cell is subjected to external shaving.

Figure 6:
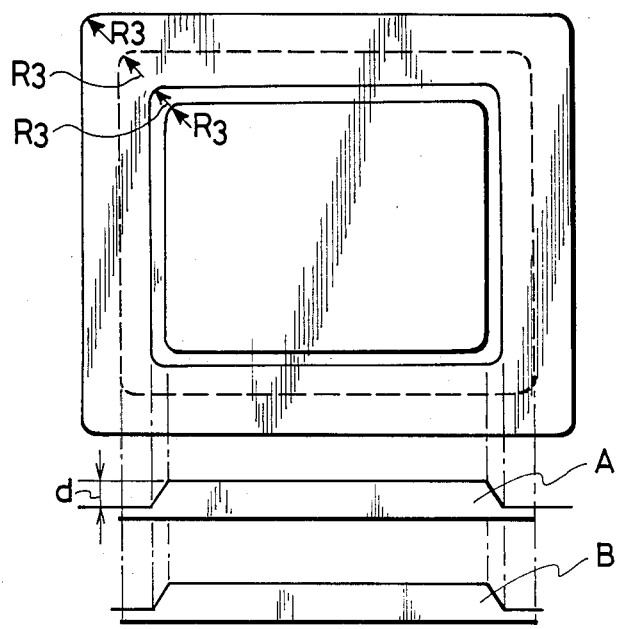
FIG. 6 shows, in plan and sectional views, the cell before and after the external shaving.

FIG. 6 shows plan and sectional views of the cell according to the arrangement before and after the external shaving.

The reference symbol A in the figure denotes the cell before the external shaving which has external dimensions of 27×32 mm, and the symbol B denotes the cell after the external shaving which has external dimensions of 23×28 mm.

Since the external dimensions of the assembled cell are the same as the external dimensions of the positive terminal plate 1, i.e., 27×32 mm, the cell is subjected to external shaving so as to have external dimensions of 23×28 mm, as shown in FIG. 6.

Figure 7:
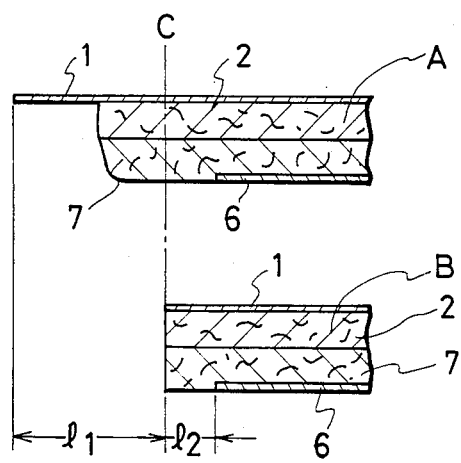
FIG. 7 is an enlarged sectional view of the peripheral edge of the cell before and after the external shaving.

FIG. 7 is an enlarged view of the peripheral edge of the cell shown in FIG. 6 before and after the external shaving. The reference symbol A in the figure denotes the cell before the external shaving, and the symbol B denotes the cell after the external shaving. When the cell A is cut along the cutting line C, the cell B with predetermined dimensions is obtained. The reference symbol $l_1$ in this figure represents a length by which the cell A is cut. It suffices to set $l_1$ at least about 2 mm. When $l_1$ is set such as to be excessively large, the amount of material which is cut and discarded increases, and this leads to a waste of material.

In the cell B having been subjected to the external shaving, the positive and negative terminal plates 1, 2 still have different external dimensions, namely, their respective peripheral edges are offset from each other by $l_2$. There is therefore no fear of the positive and negative terminal plates 1, 6 short-circuiting with each other during the external shaving. The offset amount $l_2$ is suitably set so as to fall between 0.3 and 0.5 mm.

As described above, since the flat plate type lithium cell according to the arrangement is subjected to external shaving, it is possible to effectively prevent the following phenomena which might otherwise occur: the sealing member which projects beyond a predetermined dimension adheres to the surface of the outer peripheral edge of the positive or negative terminal plate to increase the thickness to, degrade the external appearance or to make it impossible to obtain electrical conduction.

Preferably the sealing member is thermo-welded to each of the positive and negative terminal plates in advance.

The reasons why the sealing member is thermo-welded to each of the positive and negative terminal plates in advance will be explained below.

By so doing, there is no fear that the lithium, having a melting point of 170° C., is fused, or that the organic electrolyte being is thermally decomposed.

More specifically, since an amount of heat and a magnitude of pressure which are adequate for the thermo-welding can be applied for the adequate period of time, the adhesion between the positive and negative terminal plates and their corresponding sealing members become complete.

In a preferred arrangement, after the interior components of the cell have been inserted in the cell, the outer peripheral portion of the cell is sealed by heat sealing. Since the sealing members which are made of the same material are bonded to each other, the sealing operation is facilitated.

In addition, the positive and negative terminal plates and their corresponding sealing members cannot be simultaneously thermo-welded together in a single process.

In this case, therefore, the positive and negative terminal plates and the positive and negative sealing members are respectively laid one upon the other in position, and hot-pressed at 160° C. and under a pressure of 2 kg/cm² for 3 seconds so that they are tentatively thermo-welded.

At this point of time, the sealing members are only weakly bonded to the positive and negative terminal plates, respectively.

Thereafter, the positive and negative terminal plates respectively having the sealing members tentatively thermo-welded thereto are heat-treated at 200° C. for 10 minutes, whereby the sealing members and the positive and negative terminal plates are completely thermo-welded, respectively.

It is difficult from the following reasons to heat-seal the outer peripheral portion of the cell after the cell components have been assembled in accordance with the procedure that the sealing member is mounted on the positive terminal plate; the positive active substance and the separator are successively mounted in the frame; and the negative terminal plate having lithium disposed on the inner side thereof is laid on the positive terminal plate in such a manner as to cover the contents of the cell.

Namely, since the positive and negative terminal plates are made of a metal such as nickel or stainless steel, heat during the heat sealing is dissipated. In addition, since the cell has already incorporated the contents thereof, the heat during the heat sealing is more transmitted thereto and absorbed thereby.

To effect heat sealing despite this fact, it is only necessary to raise the temperature for heat sealing and to extend the press time. In such case, however, the contents of the cell are heated excessively, and since the thermal expansion coefficient and the thermal shrinkage coefficient of the terminal plates and those of the sealing members are different from each other, the heat-sealed portion along the outer periphery of the cell may be wrinkled, or the cell as a whole may be warped, disadvantageously.

For this reason, the sealing members in accordance with the arrangement may be separately thermo-welded to the positive and negative terminal plates in advance.

Preferably the cell having been subjected to the external shaving is discharged and then submitted to practical use, for example, the cell being discharged for 6 minutes at 20 mA.

The discharge amount by which the cell is discharged before actual use, is suitably selected to be about 5% of the theoretical capacity of the cell.

Whether this discharge amount is suitable or not may be understood from the fact that the open-circuit voltage of the cell after the use for 24 to 48 Hr at room temperature is 3.0 to 3.1 V. The open-circuit voltage before the discharge processing is 3.38 to 3.44 V.

Flat plate type lithium cells according to the present invention, produced as detailed above, and cells having the conventional structure in which the positive and negative terminal plates have the same external dimensions, such as that shown in Japanese Unexamined Patent Publication No. 83340/1984, were prepared, and the number of cells having short-circuiting failure immediately after the assembling was examined. Samples of the short-circuit test were limited to those having an open-circuit voltage of 3 V or less. The results are shown in Table 5 below.

TABLE 5

|                      | Ratio of failure (%) |
|----------------------|----------------------|
| Cell of the invention | 0%                   |
| Conventional cell    | 62%                  |

As will be clearly seen from Table 5, the conventional cells have an extremely large number of short-circuiting failures.

The following is an explanation of the reason why the discharge processing is carried out after the cell according to the present arrangement has been assembled.

Table 6 is a table in which are shown open-circuit voltage of the cell (Voc/V), internal resistance (Ri/Ω) and the amount by which the cell of the present arrangement (ΔH/=0.01 mm) swells when it was processed at various discharge currents and various discharge periods of time.

The cell swell amount was obtained in such a manner that, after cells had been discharged under various conditions, they were stored under the conditions that the temperature was 80° C. and the relative humidity (RH) was 90 to 95%, and the difference between the thickness of each cell before and after the storage was measured every 5 days.

TABLE 6

|  | Discharge current (mA) | Discharge time (minute) | | | | | | | |
|---|---|---|---|---|---|---|---|---|---|
|  |  | 2 | | | | 6 | | | |
|  |  | Storage (day) | | | | | | | |
|  |  | 0 | 5 | 10 | 15 | 0 | 5 | 10 | 15 |
| Voc (V) | 10 mA | 3.01 | 3.24 | 3.24 | 3.21 | 2.98 | 3.22 | 3.27 | 3.21 |
|  | 15 | 3.00 | 3.25 | 3.28 | 3.20 | 2.97 | 3.22 | 3.26 | 3.17 |
|  | 20 | 2.99 | 3.23 | 3.28 | 3.23 | 2.96 | 3.22 | 3.26 | 3.22 |
| Ri (Ω) | 10 | 23.7 | 116.7 | 260 | 400 | 21.7 | 105 | 240 | 253 |
|  | 15 | 21.0 | 90.7 | 206.7 | 403.3 | 17.0 | 73.3 | 273.3 | 218.3 |
|  | 20 | 18.0 | 83.7 | 250.0 | 400.0 | 14.0 | 26.0 | 83.3 | 160.0 |
| ΔH (1 = 0.01 mm) | 10 | 0 | 5.8 | 17.8 | 33.7 | 0 | 1.5 | 5.7 | 21.0 |
|  | 15 | 0 | 1.8 | 12.5 | 29.0 | 0 | 1.5 | 4.2 | 16.2 |
|  | 20 | 0 | 1.8 | 10.3 | 27.5 | 0 | 1.7 | 1.7 | 10.3 |

As will be clearly seen from Table 6, a discharge current of 20 mA is most effective to minimize the swell of the cell. As to the discharge time, 6 minutes is more effective than 2 minutes to minimize the bulge of the cell.

The bulge of the cell is decreased by increasing the discharge current and extending the discharge time as described above.

The present inventor presumes that the storage of a cell for 5 days under 80% and RH 90% corresponds to the storage of a cell for 1 year at 25° C. Therefore, the conditions of 20 mA and 6 minutes or more are suitable for satisfying the condition in which the amount of swell of the cell is 5 or less after the storage for 15 days, i.e., for 3 years at 25° C. The amount of discharge as a result of discharging the cell at 20 mA for 6 minutes is 2 mAh, which corresponds to 5.2% of the theoretical cell capacity of CS2328 (open-circuit voltage: 3 V; nominal capacity: 30 mAh; and size: 23×28×0.5 mm) to which one embodiment of the flat plate type lithium cell according to the present invention is applied.

It is presumed that an increase in the discharge amount stabilizes $MnO_2$ in the positive mixture sheet and consequently reduces the amount of $CO_2$ generated by the reaction between the $MnO_2$ and the electrolyte. However, if the cell is excessively discharged, the cell capacity is decreased inconveniently.

Accordingly, it is necessary to appropriately balance the discharge amount and the bulge of the cell.

As described above in detail, a two-material three-layer film composed of maleic acid modified polyethyle and a high-density polyethyle resin is employed as a sealing member, and this sealing member is thermowelded to each of the positive and negative terminal plates in advance, whereby it is possible to effect heat sealing readily and reliably and to improve the sealing properties by a large margin.

Having described the invention as related to the embodiment shown in the accompanying drawings, it is our intention that the invention be not limited by any of the details of description, unless otherwise specified, but rather be construed broadly within its spirit and scope as set out in the accompanying claims.

What is claimed is:

1. A flat cell comprising: a positive terminal plate having an inner surface; a positive material in contact with the inner surface of the positive terminal plate; a negative material opposed to the positive material; a separator interposed between the positive material and the negative material, said separator containing an electrolyte; a negative terminal plate having an inner surface in contact with the negative material, the negative terminal plate being confronted with the positive terminal plate at their peripheral portions; and sealing means for sealing the confronted peripheral portions of the positive and negative terminal plates with each other, said sealing means comprising a positive sealing member formed on the peripheral portion of the positive terminal plate and a negative sealing member formed on the peripheral portion of the negative terminal plate, said positive sealing member and said negative sealing member being composed of a two-material three-layer film formed of a maleic acid modified polyethylene resin layer/a high-density polyethylene resin layer/a maleic acid modified polyethylene resin layer.

2. A flat cell as claimed in claim 1; wherein the separator has a peripheral portion clamped by the positive sealing member and the negative sealing member.

3. A flat cell as claimed in claim 1; wherein the positive material contains the electrolyte.

4. A flat cell as claimed in claim 1; wherein the peripheral portions of the positive terminal plate and the negative terminal plate are hermetically sealed with each other by the combination of the positive sealing member and the negative sealing member.

5. A flat cell as claimed in claim 1; wherein the maleic acid modified polyethylene resin layer comprises an intermediate-density polyethylene graft-polymerized with 0.05 to 0.20% maleic acid.

6. A flat cell as claimed in claim 1; wherein the maleic acid modified polyethylene resin layer has a thickness of 25 to 30 μm, and the high density polyethylene resin layer has a thickness of 50 to 200 μm.

7. A flat cell as claimed in claim 1; wherein the two-material three-layer film is produced by an inflation method.

8. A flat cell as claimed in claim 11; wherein the positive material comprises a positive mixture sheet formed of manganese dioxide ($MnO_2$), an electrically conductive material and a binder.

9. A flat cell as claimed in claim 8; wherein the negative material comprises lithium and the electrolyte is comprised of a propylene carbonate containing lithium perchlorate ($LiClO_4$).

10. A flat cell as claimed in claim 1; wherein the positive or negative terminal plate is subjected to drawing.

11. A flat cell as claimed in claim 1; wherein the positive terminal plate and negative terminal plate have different peripheral dimensions.

12. A flat cell as claimed in claim 1; wherein the separator comprises two strips of polypropylene nonwoven fabric.

13. A flat cell as claimed in claim 12; wherein the separator is produced by a micro-spunded method.

14. A flat cell comprising: a positive terminal substrate having central and peripheral inner surfaces; a negative terminal substrate having a central inner surface spaced apart from the central inner surface of the positive terminal substrate and a peripheral inner surface confronting the peripheral inner surface of the positive terminal substrate; a positive electrode disposed in contact with the central inner surface of the positive terminal substrate; a negative electrode disposed in contact with the central inner surface of the negative terminal substrate in opposed relation to the positive electrode; a separator interposed between the opposed positive and negative electrodes; and a pair of sealing films disposed on the respective peripheral inner surfaces of the positive and negative terminal substrates in confronting relation with each other, each sealing film being comprised of a first thermoplastic layer having a relatively low melting temperature and a relatively large adhesive capacity so that the first layer is thermally secured to the peripheral inner surface, a second thermoplastic layer formed on the first layer and having a relatively high melting temperature and a relatively small adhesive capacity, and a third thermoplastic layer formed on the second layer and having a relatively low melting temperature and a relatively large adhesive capacity so that the confronting third layers of the pair of sealing films are thermally secured with each other to seal the flat cell.

15. A flat cell as claimed in claim 14; wherein the second thermoplastic layer has a thickness larger than those of the first and third thermoplastic layers.

16. A flat cell as claimed in claim 15; wherein the second thermoplastic layer has a thermoplastic fluidity smaller than those of the first and third thermoplastic layers so that the second thermoplastic layer is not substantially thermally deformed during the sealing of the flat cell.

17. A flat cell as claimed in claim 15; wherein the second thermoplastic layer has a moisture permeability smaller than those of the first and third thermoplastic layers.

18. A flat cell as claimed in claim 14; wherein the first and third thermoplastic layers comprise a polyethylene modified by maleic acid.

19. A flat cell as claimed in claim 18; wherein the polyethylene modified by the maleic acid comprises an intermediate-density polyethylene graft-polymerized with 0.05 to 0.2% of maleic acid.

20. A flat cell as claimed in claim 14; wherein the second thermoplastic layer comprises a high-density polyethylene.

21. A flat cell as claimed in claim 14; wherein the separator has a peripheral portion clamped by the pair of sealing films.

22. A flat cell as claimed in claim 14; wherein the separator contains electrolyte.

23. A flat cell as claimed in claim 14; wherein the separator comprises a double layer of polypropylene nonwoven fabric.

24. A flat cell as claimed in claim 14; wherein the positive electrode comprises a sheet composed of manganese dioxide, an electrically conductive material and a binder.

25. A flat cell as claimed in claim 14; wherein the negative electrode comprises a sheet composed of lithium.

26. A flat cell as claimed in claim 22; wherein the electrolyte comprises a propylene carbonate containing lithium perchlorate.

27. A flat cell as claimed in claim 14; wherein one of the positive and negative terminal substrates has a drawn central inner surface to define a cavity for accommodating therein the corresponding electrode.

28. A flat cell as claimed in claim 14; wherein the positive and negative terminal substrates have different peripheral dimensions.

29. A flat cell as claimed in claim 14; wherein the sealing film comprises an inflated film having isotropic thermal shrinkage and expansion coefficients.

* * * * *